United States Patent [19]
Herbst

[11] 3,923,349
[45] Dec. 2, 1975

[54] UNIVERSAL BEARING SUPPORT
[75] Inventor: Paul T. Herbst, Erie, Pa.
[73] Assignee: Lord Corporation, Erie, Pa.
[22] Filed: June 25, 1973
[21] Appl. No.: 373,551

[52] U.S. Cl. .................. 308/26; 308/72; 403/58; 403/79; 403/228
[51] Int. Cl.² .......................................... F16C 27/00
[58] Field of Search ........ 248/184; 403/58, 57, 224, 403/228, 74, 158, 79; 308/26, 72

[56]  References Cited
UNITED STATES PATENTS

| 797,267 | 8/1905 | Crutchlow | 403/58 |
|---|---|---|---|
| 837,200 | 11/1906 | Crutchlow | 403/58 |
| 1,501,550 | 7/1924 | Baumann | 74/471 XY |
| 2,452,352 | 10/1948 | Booth | 308/36.1 |
| 2,500,048 | 3/1950 | Stoiber | 248/184 |
| 2,819,105 | 1/1958 | Behnke | 403/228 |
| 2,943,646 | 7/1960 | Thatcher | 403/79 |
| 3,165,065 | 1/1965 | Stickel | 403/228 |
| 3,858,411 | 1/1975 | Hiersig | 403/58 |

Primary Examiner—Charles J. Myhre
Assistant Examiner—R. H. Lazarus
Attorney, Agent, or Firm—James W. Wright

[57] ABSTRACT

A universal bearing support for supporting one part relative to another is provided comprising first and second spherical bearing assemblies of the ball-and-socket type. The ball of the first assembly is adapted for mounting to one of the parts and the socket of the second assembly is adapted for mounting to the other of the parts. The socket of the first assembly is interconnected to the ball of the second assembly through elastomeric means subject to shear during relative movement of the balls of the assemblies along an axis passing through their respective centers.

7 Claims, 2 Drawing Figures

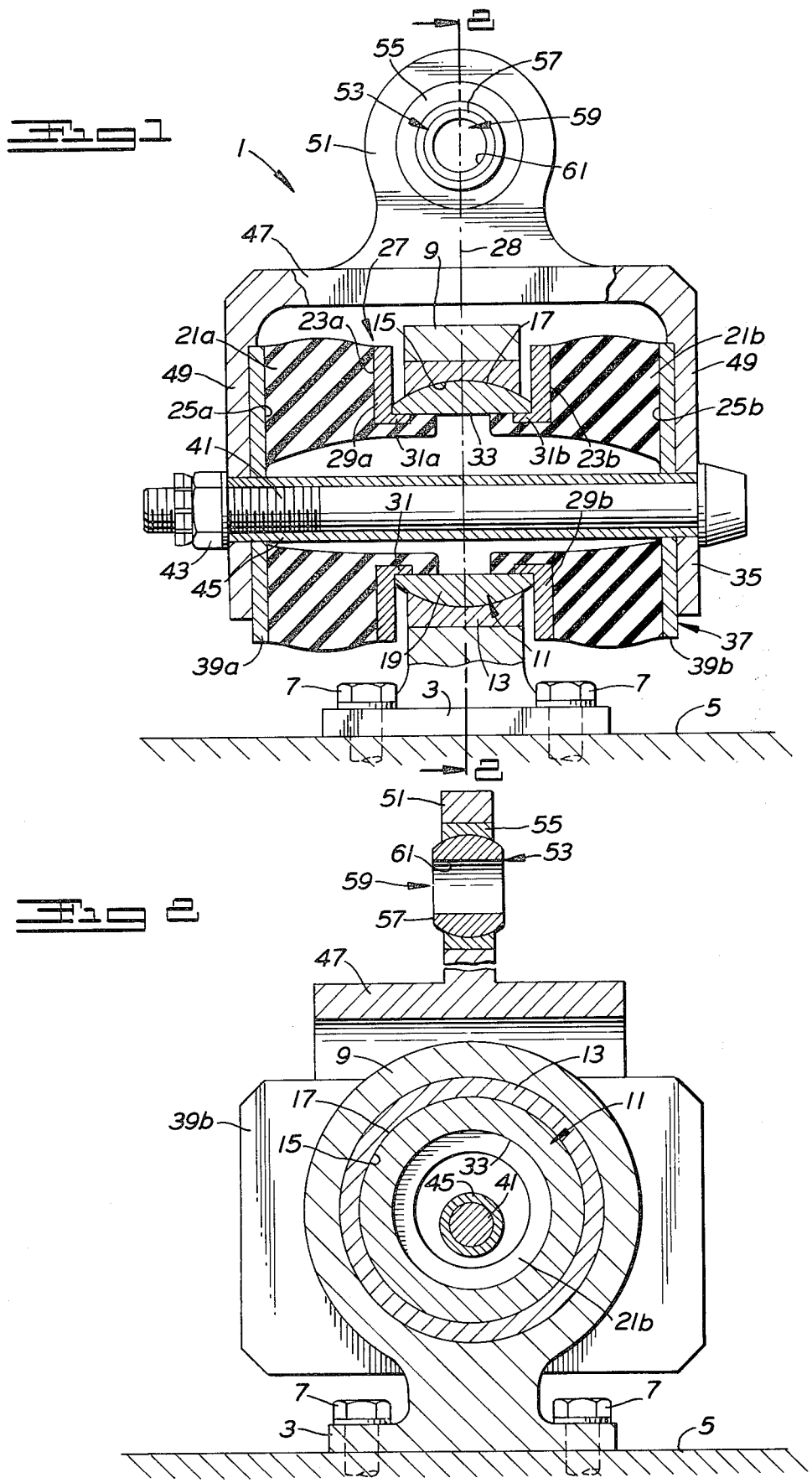

UNIVERSAL BEARING SUPPORT

This invention relates to support devices and more particularly to bearing support devices of the ball-and-socket type for connecting parts together while permitting universal or omnidirectional relative movement therebetween.

DESCRIPTION OF THE PRIOR ART

Bearing supports of the ball-and-socket type are well-known in the art. Typically, a single ball-and-socket assembly is employed with the ball connected to one of the supported and supporting parts with the socket connected to the other. Spherical movement of the supported part relative to the supporting part is permitted by sliding movement between the ball and socket. A pair of interconnected ball-and-socket assemblies have been employed where universal relative movement between the supported and supporting parts is desired.

In order to provide shock and vibration isolation characteristics to such bearing supports, resilient material such as elastomer and the like has been included between the socket and one of a supporting and supported part. Typically, the resilient material acts in compression, a relatively stiff uneffective mode, to attenuate shock and/or vibration.

SUMMARY OF THE INVENTION

It is an object of the present invention to provide a bearing support of the ball-and-socket type wherein the ball is resiliently mountable relative to one of a supported and supporting part.

Another object of the present invention is to provide such a bearing support wherein the ball is resiliently mounted by elastomeric means active in shear.

A further and more specific object of the present invention is to provide a bearing support including a pair of ball-and-socket type bearing assemblies wherein the ball of one assembly and the socket of the other assembly are interconnected through elastomeric means subject to shear during relative movement of the balls of the assemblies along an axis passing through their respective centers.

Briefly, the objects of the present invention are provided for in a bearing support comprising first and second spherical bearing assemblies of the ball-and-socket type. The ball of the first assembly is adapted for mounting to one of a supporting and supported part and the socket of the second assembly is adapted for mounting to the other of the parts. The socket of the first assembly is interconnected to the ball of the second assembly through elastomeric means. The elastomeric means permits relative motion along an axis passing through the respective centers of the balls by undergoing shear deflection. Relative motion along all other axes is freely permitted through sliding movement between the balls and sockets of the spherical bearing assemblies. The bearing support can thus support and isolate shock and vibration from one part relative to another along an axis passing through the respective centers of the balls while freely permitting relative motion along other axes.

It is desired that the effective elastic center of the elastomeric means coincide with the axis passing through the centers of the balls of the spherical bearing assemblies and preferred that the effective elastic center of the elastomeric means coincide with the center of one of the balls for stability purposes.

BRIEF DESCRIPTION OF THE DRAWINGS

FIG. 1 is a front elevational view with parts in section of an embodiment of this invention.

FIG. 2 is a sectional view taken substantially along the line 2–2 of FIG. 1.

DESCRIPTION OF THE PREFERRED EMBODIMENT

The bearing support of this invention comprises a pair of spherical bearing assemblies of the ball-and-socket type and other related construction. As used herein, the term "ball-and-socket assembly" is defined as a centrally segmented portion of a sphere or a ball truncated by parallel planes equidistant from the center thereof that is complementally positioned within a spherical socket truncated by parallel planes equidistant from the center thereof having a width more or less equal to the width of the ball. The term "central plane" of the ball or socket is defined as a plane parallel to the truncating planes and passing through the center of the ball or socket.

Referring now to the drawings wherein like elements are identified by like numerals throughout, there is shown in FIGS. 1 and 2 a preferred embodiment of the present invention. There is illustrated a bearing support, generally indicated at 1, comprising a base 3 for mounting to a supporting part 5 by conventional attachment means such as bolts 7. Base 3 includes an upwardly standing eye portion 9 having mounted therein ball-and-socket assembly 11. Assembly 11 comprises a socket or race 13 fixedly mounted in eye portion 9 of base 3 and centrally located in respect thereto such that the central plane of eye portion 9 and the central plane of socket 13 are parallel and preferably coincident. The innermost surface of socket 13 forms a spherical bearing surface 15 that mates in sliding complemental relationship with the bearing surface 17 of a ball 19 operatively mounted therein.

A pair of substantially identical elastomeric pads 21a and 21b are disposed on opposite sides of the ball 19 equidistant from the central plane thereof and in spaced relation to the socket 13 and eye portion 9 of base 3. The pads 21a and 21b include opposed parallel planar surfaces 23a and 25a and 23b and 25b, respectively, that are oriented parallel to the central plane of ball-and-socket assembly 11 as indicated by dotted line 28. Attachment means 27 in the form of washers 29a and 29b are bonded to proximate pad surfaces 23a and 23b, respectively, and include collars 31a and 31b that are received and secured by conventional means in a centrally located aperture 33 formed in ball 19.

The remote parallel elastomeric pad surfaces 25a and 25b are attached to a bracket 35 through attachment means 37. Attachment means 37 comprises a pair of washers 39a and 39b, bonded to respective pad surfaces 25a and 25b, a center bolt 41, nut 43 and guide sleeve 45 to be hereinafter more fully described. Bracket 35 is bifurcated and straddles or circumscribes ball-and-socket assembly 11 and comprises a base plate 47 and spaced support arms 49 depending from plate 47 and disposed adjacent washers 39a and 39b. Guide sleeve 45 is disposed normal to the central plane of the ball 19 through the aperture 33 of ball 19, and openings in washers 29a and 29b, pads 21a and 21b, washers 39a and 39b and depending bracket arms 49. The aperture 33 of ball 19 and openings in washers 29a and 29b and pads 21a and 21b are enlarged relative to the size of sleeve 45 so that relative movement may take place therebetween in a plane parallel to the central plane of ball 19. The openings in washers 39a and 39b and bracket arms 49 provide engagement circumferentially with the sleeve 45 and cause movement therebetween as a unit parallel to the central plane of the ball 19. Bolt 41 is mounted through the sleeve 45 between the bracket arms 49 and secured by nut 43 to precompress the pads 21a and 21b between the ball 19 and bracket arms 49. This precompression has been found to increase the fatigue life of the bond between the washers and pads. It will also be noted that the sleeve 45 and bolt 41 provide a fail safe feature in the event of failure of the pads or the bonds.

An upstanding eye portion 51 is mounted on base plate 47 perpendicular to the eye portion 9 and contains a ball-and-socket assembly 53. Assembly 53 comprises a socket or race 55 fixedly mounted or formed in eye portion 51 with a central plane perpendicular to socket 13 of ball-and-socket assembly 11. The socket 55 defines an inner spherical bearing surface that mates in complementary relationship with the outer bearing surface of a ball 57 operatively mounted therein. It is desirable that the ball-and-socket assemblies 11 and 53 be arranged, as shown, with the central planes of each intersecting at a common line, line 28, which includes the centers of both balls 19 and 57.

Means 59 is provided in ball 57 for connection to the part to be supported. Means 59 is shown to comprise an aperature 61 through the ball 57 for receiving a shaft therein; however, other means are contemplated such as a threaded aperture for threadably receiving the end of a tierod or the like.

The arrangement of identical elastomeric pads 21a and 21b equidistant from and parallel to the central plane of ball 19 makes the combined effective elastic centers of the pads 21a and 21b coincide with the axis passing through the respective centers of the balls 19 and 57. Furthermore, it is desired that this effective elastic center coincide with the center of ball 19. Thus, forces uniformly applied by the bracket arms 49 to the pads 21a and 21b will cause the pads to be loaded in shear and deflected parallel to the axis passing through the respective centers of the balls 19 and 57. Otherwise, the pads would not be loaded solely in shear and there would be instability along the axis passing through the balls 19 and 57.

Preferably, as shown, the assembly of the bracket arms 49 to the washers 39a and 39b via the sleeve 45, bolt 41 and nut 43 is such as to predeflect or offset the combined effective elastic center of the pads 21a and 21b along the axis passing through the respective centers of the balls 19 and 57 in a direction away from ball 57. This is purposely done so that when the bearing support 1 is connected in supporting relation between a supporting and supported part, the applied load will deflect the pads 21a and 21b to move their combined effective elastic center to substantially coincide with that of the ball 19 and also maximize the allowable motion accommodation along the axis passing through the centers of the balls 19 and 57.

Operationally, the cooperation of the ball-and-socket assemblies 11 and 53 will accommodate universal motion between the supporting and supported parts. Relative motion of the parts along the axis passing through the ball centers will result in shearing deformation of the elastomeric pads. Relative motions of the parts along all other axes will be substantially unrestricted by the bearing support 1. Thus, it will be apparent that the bearing support may be employed as a support device where a spring rate for vibration and shock isolation is desired only along a given axis. By the elastomeric pads being active in shear, a relatively low spring rate can be provided.

In the drawings and specification, there has been set forth a preferred embodiment of the invention and, although specific terms are employed, they are used in a generic and descriptive sense only and not for purposes of limitation.

What is claimed is:

1. A bearing support for supporting one part relative to another comprising:

first and second ball-and-socket bearing assemblies,
said ball of said first assembly adapted for mounting to one of the parts,
said socket of said second assembly adapted for mounting to the other part, and
means resiliently interconnecting said socket of said first assembly and said ball of said second assembly, said interconnecting means including elastomeric means adapted to deflect in shear to permit relative movement between said balls of the first and second assemblies along an axis passing through the respective centers of both of said balls.

2. A bearing support, according to claim 1, wherein said interconnecting means includes a bracket having spaced arms and being carried by said socket of said first assembly with said arms straddling said second assembly and disposed parallel to the axis passing through the respective centers of said balls, said elastomeric means including a pair of elastomeric pads disposed on opposite sides of said ball of said second assembly between said arms parallel to said axis and interconnecting said arms and the ball of said second assembly.

3. A bearing support, according to claim 2, wherein said pair of elastomeric pads are spaced from said socket of said second assembly to permit relative movement between said ball and socket of said second assembly.

4. A bearing support, according to claim 2, wherein said pair of elastomeric pads are identical and are spaced equidistant from said axis whereby the effective elastic center of said pads coincides with said axis.

5. A bearing support, according to claim 2, wherein an aperture is provided through the center of the ball of the second assembly and through each of the elastomeric pads and wherein the interconnecting means includes shaft means extending between and coupled to the arms of the bracket, the shaft means passing through said apertures and having an outer diameter less than the diameters of said apertures so as to permit relative radial movement of the shaft means in the apertures.

6. A bearing support, according to claim 2, including means for precompressing said elastomeric pads between said arms and the ball of the second assembly normal to said axis.

7. A bearing support for supporting one part relative to another comprising first and second ball-and-socket bearing assemblies, said ball of said first assembly adapted for mounting to one of the parts, said socket of said second assembly adapted for mounting to the other part, and means resiliently interconnecting the socket of the first assembly and the ball of the second assembly, said inter-connecting means including elastomeric means symmetrically disposed about an axis passing through the respective centers of both of said balls of the first and second assemblies, said elastomeric means resiliently permitting relative movement between said balls along said axis by shear deflection thereof and cooperating with each of said assemblies to permit relative rotation between the ball and socket of each assembly independently of said elastomeric means.

* * * * *